May 8, 1934.   H. E. BARNES   1,957,432
SYSTEM FOR RECORDING THE TIMING CONDITIONS IN INTERNAL
COMBUSTION ENGINE IGNITION CIRCUITS
Filed Aug. 12, 1930   2 Sheets-Sheet 2
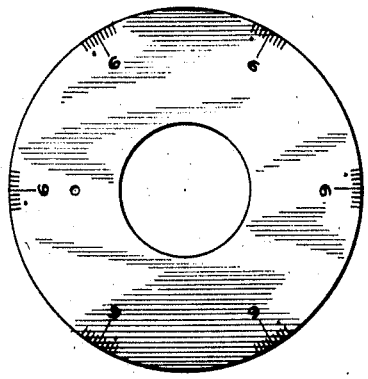
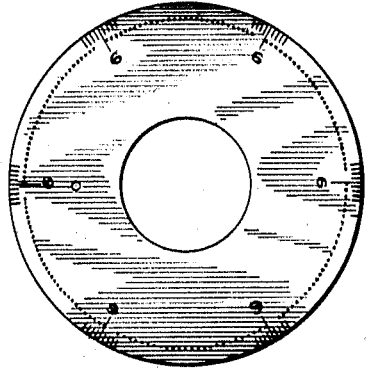
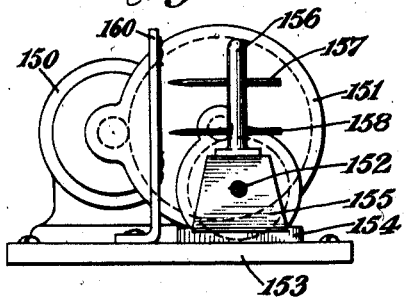
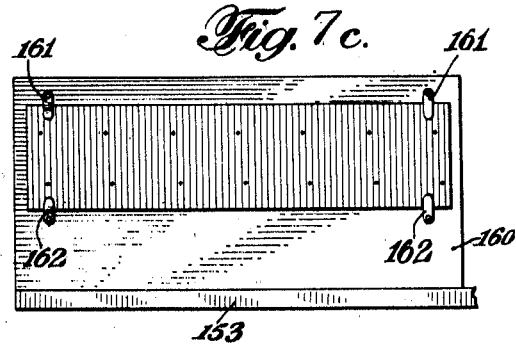
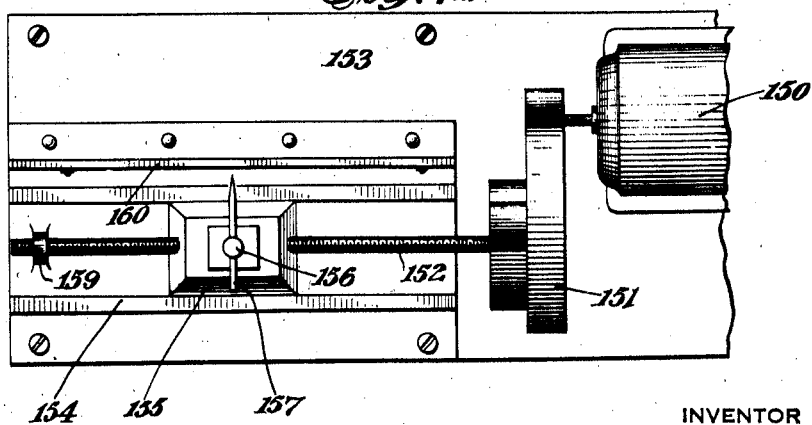
INVENTOR
Harold E. Barnes
BY
ATTORNEY Patented May 8, 1934

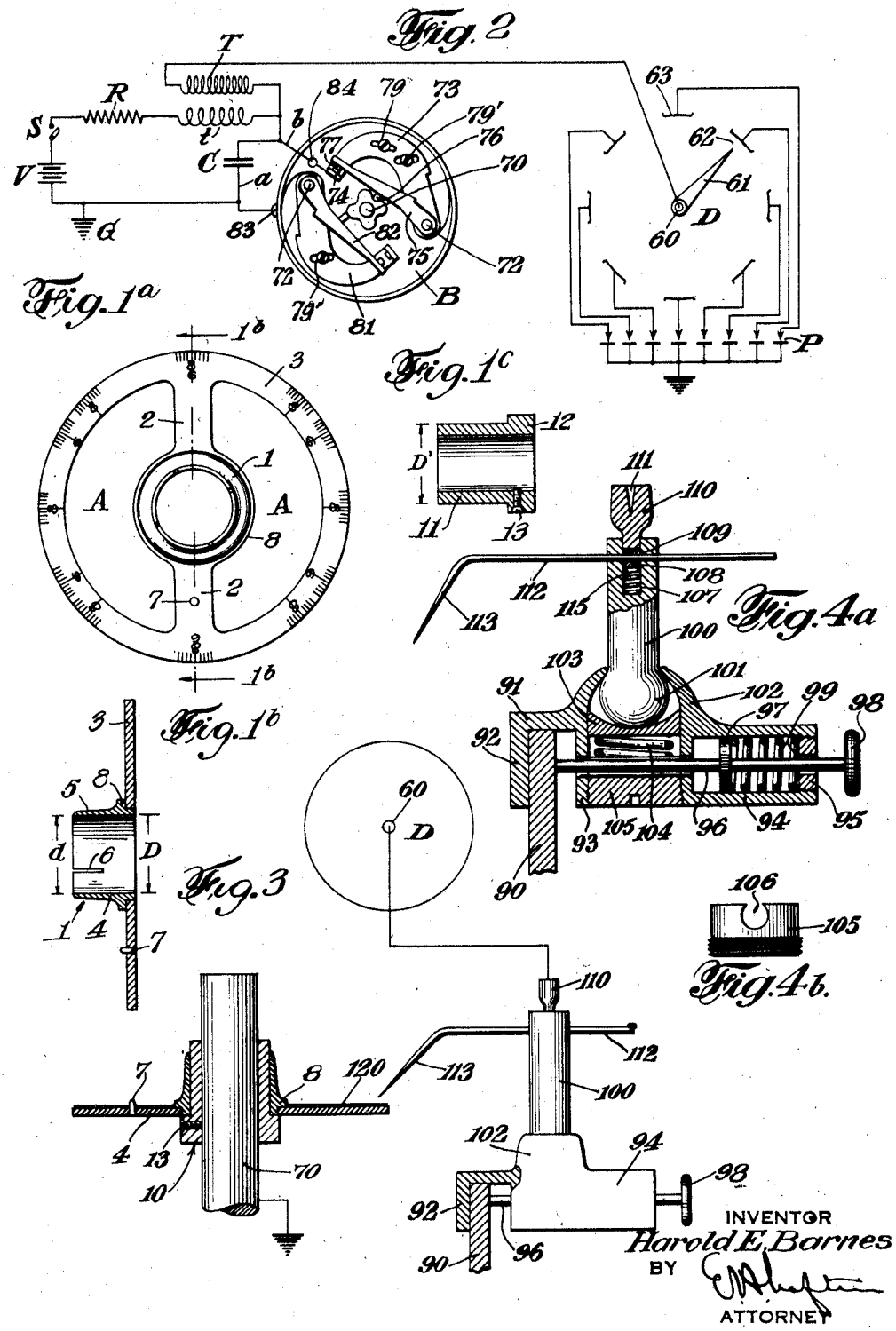

1,957,432

UNITED STATES PATENT OFFICE 1,957,432

SYSTEM FOR RECORDING THE TIMING CONDITIONS IN INTERNAL COMBUSTION ENGINE IGNITION CIRCUITS

Harold E. Barnes, East Orange, N. J.

Application August 12, 1930, Serial No. 474,861

6 Claims. (Cl. 234—36.5)

This invention relates to several improvements in testing equipments for the testing of timer devices of internal-combustion engines and also to a new method of making permanent records of the firing conditions of such engines. Due to its simplicity and constant readiness for use and for still other reasons my improved apparatus will be of special value to the automobile repair shop; however, its applicability is by no means limited to this field.

Heretofore the testing of timer devices has been carried out in a more or less make-shift manner involving imperfections which it is the purpose of this invention to overcome. One object of my invention is to provide a graduated timing disk for attachment to the timer shaft which disk is so formed that the necessary adjustments of breaker points in the timer casing can be made without obstruction from the attached disk. In conjunction with this timing disk I provide a reference post of specific construction having an adjustable pointer cooperating with the scale on the timing disk which pointer may also serve as a high-potential electrode to form a spark gap with the surface of the disk. Another novel feature of my invention is a dial which can be removably placed on the timing disk for electric markings from the pointer electrode for the purpose of obtaining a quick, reliable and lasting record of the firing conditions. Such and other advantages will become more apparent from the following description and the drawings connected therewith.

In the drawings the various figures designated 1 constitute a showing of my improved timing disk in its preferred form, Fig. 1a giving a top plan view, Fig. 1b a cross-section substantially on line 1b—1b, and Fig. 1c a cross-section of the bushing or adapter forming a part of the complete assembling;

Fig. 2 is a schematic representation of a conventional automobile timing which may be connected for testing purposes to my recording arrangement of Fig. 1.

Fig. 3 shows the timing disk in position for receiving spark records.

The various figures designated 4 constitute an illustration of a preferred form of my reference post, Fig. 4a showing the post attached to a wall portion of the timer casing, and Fig. 4b being a view of a structural element of the post;

Fig. 5 is a picture of one sort of spark record obtained with my equipment;

Fig. 6 is a picture of another sort of spark record obtained with a modified equipment;

The figures designated 7 illustrate a modified form of spark recording instrument according to my invention, Fig. 7a being a plan view of the recorder, Fig. 7b a side view and Fig. 7c a front view of the record panel also depicting the appearance of the spark record of a six-cylinder, double-spark-plug engine.

Before describing the several improvements and the way they are used to advantage in the tests, I shall first give a short account of the general plan which underlies my arrangements and of which my various improvements are a natural outgrowth. Among the different troubles in the operation of a motor car ignition troubles belong to the most frequent ones and, furthermore, repairs on the timing mechanism of the car usually arouse the owner's suspicion as to their necessity, since the average driver has but little, if any, clear conception of the timer mechanism and the importance of its exact operation. Moreover, it is a known fact, that due to the laborious task of accurately checking and adjusting a timer mechanism with the usual make-shift apparatus many jobs leave the repair shop in a condition far from being perfect. As a consequence renewed troubles soon set in, corroborating the customer in its attitude that somehow or other he was not fairly treated at the presentation of his bill. The arrangement which I have developed and which forms the basis of the present invention not only allows the work to be performed accurately, but also gives the foreman and the customer the opportunity of precisely checking up the firing conditions of the car when it is entering and leaving the shop. A permanent spark record will be taken in the presence of the customer when placing his car in the shop and be handed over to him for preservation; likewise, he will attend the taking of a similar record before the return of the car after its repair thus enabling him, by comparison of the two records, to see for himself the correction made in his timing mechanism. The taking of these records will, in most cases, require only a very short time. These records furnish an absolute proof of the firing conditions in the cylinders and, as will be appreciated, they not only form a control that will necessarily improve the work of the mechanic entrusted with this kind of adjustment, but will also help to remove a widespread distrustful attitude of the car owner towards the repair shop.

Referring to the figures designated 1, I describe my improved timing disk. The disk is made up of two separate parts, the disk element proper as shown in Figs. 1a and 1b and the bushing or adapter 11 illustrated in Fig. 1c. In assembling the two parts on the timer device for testing purposes the bushing after the removal of the cap of the timer casing and the distributor rotor, is slipped over the free end of the timer shaft and immovably and concentrically held on it by means of a set screw 13 or some other suitable means at the lower collar portion 12 of the bushing. It will be understood that, in order to meet the requirements of concentric adaptation to timer shafts of different diameters, a plurality of of adapters may be furnished with each disk element. The disk is slipped over the upper portion 11 of the bushing about which it can be rotated. In order to secure a proper fit of the disk on the bushing irrespective of wear in the bearing faces, that is, a fit tight enough to prevent unintentional displacements between the two parts and loose enough to permit rotational adjustments of the two parts with respect to one another without undue frictional reaction, I provide the disk with a hub 1 which, as will be noted from Fig. 1b, has an upper portion 5 with axially extending slits 6 therein and a lower non-slitted portion 4. The bore diameter $d$ of the upper portion is smaller than any diameter in the lower portion such as $D$, the discrepancy between the two diameters, for the sake of clearness, being exaggerated in the illustration. The external diameter $D'$ of the bushing is so small as to fit only loosely in the lower hub portion, but when the hub is being further depressed the entering bushing will expand the upper slitted portions of the hub, which are sufficiently elastic to guarantee a permanently correct elastic engagement between the two parts. The choice of this kind of engagement between the bearing faces has the advantage that the mechanic will be enabled to perform the setting of the disk or its scale relative to a zero mark with great accuracy.

As shown in Fig. 1a my timing disk is formed as an annular disk with a comparatively narrow rim 3 and with comparatively wide apertures A, A between the annular disk portion 3, the hub portion 1 and the two connecting spokes 2, 2, the whole body having the shape of a wheel. The formation of the timing disk as a wheel with comparatively wide spaces between its different body portions constitutes a feature of great convenience in the use of the instrument which, as far as I know, has never been appreciated in prior designs. In testing the functioning of breaker points it is necessary to combine testing and adjusting operations alternately in order to obtain quick results. This can only be done if the breaker points are easily accessible from above as will be the case with my timing disk where the tool, a screw-driver or the like, can reach through the apertures in the disk. I, therefore, select the circumferential dimensions of my disk large enough to meet the before mentioned requirement and small enough to satisfy the condition that the scale on the rim, for convenient cooperation with a zero mark, is not too far removed from the wall portions of conventionally used timer casings.

One of the spokes—of which I usually provide two—carries on its face side a little pin-like projection as indicated at 7 in Figs. 1a and 1b. As mentioned already above, I prefer to put a dial sheet on top of the timer disk for making spark records. These dial sheets are centrally apertured to fit closely about the cylindrical base portion 8 of the hub. In order to hold the dial fixed on the disk against rotational displacements, the pin 7 engages in a corresponding little hole in the dial sheet.

On the rim a plurality of sector markings may be engraved corresponding to different multiple-cylinder arrangements as, for example, depicted in Fig. 1a for a six and eight-cylinder engine. A finer sector graduation in degrees may, furthermore, be provided on both sides of the wider sector marks in order to facilitate the gauging of firing irregularities.

From the foregoing description it will be clear that the various advantageous features incorporated in my design make this timing disk an instrument of superior qualities quite independent of whether it is being used in combination with my other improvements, to be described subsequently, or with arrangements of more or less make-shift character.

For explanatory purposes an ignition system of the type widely adopted nowadays has been chosen. However, from the following explanations it will be apparent that neither my outfit nor my testing method are limited in their use to the specific timing system illustrated in Fig. 2. V is the source of steady potential (battery) of the low-tension circuit formed by the switch S, the protective resistance R, the low-tension coil $t$, the breaker mechanism B in shunt with condenser C, and the connections between these various elements also comprising a ground connection G.

The breaker mechanism shown is a double-arm mechanism with its two arms 75, 82 serially connected, and the current is supposed to flow from lead $b$ through stationary breaker point 74 to movable breaker point 77, from arm 75 to arm 82 (connection not shown) and from there through breaker points of arm 82 and lead $a$ to the ground terminal of the source V. The illustration of the breaker mechanism is merely schematic, showing only the essential functional parts and omitting internal circuit connections for greater clearness. The timer-shaft with four-lobed cam is indicated at 70. The lobes strike against riders 76, thereby rocking the arms about their pivotal points 72 and thus breaking and making the contact at the breaker points. The breaker arms are pivotally mounted at 72 on brackets or supports 73 and 81 respectively which supports are in turn mounted on a base plate. This base plate permits of rotation and fixation of its position with respect to the timer casing, so that the beginning of the opening period of the breaker points can be simultaneously shifted. One of the brackets is usually fixedly mounted on the base plate, whereas the other bracket can be adjusted in its relation to the first bracket by means of a slot and screw engagement as indicated at 79. In addition, both brackets can be independently rocked relative to the base plate about their pivotal points 72 and be fixed in the desired position by a slot and screw engagement for each bracket as indicated at 79'. These several adjustments are required, first, for setting the beginning of an individual contact interruption in definite relation to the position of the coordinated piston, secondly, for setting the beginning of following contact interruptions on definite marks of the scale of the timing disk, and thirdly, for establishing about the same contact opening time for all interruptions, so that the firing conditions will be practically uniform for all spark plugs. It is obvious that the adjustment of the brackets about their pivotal points not only changes the duration of the contact opening period, but also the beginning of this period in respect to the piston position. I have inserted these remarks referring to the adjustment of a conventional timer mechanism for a better understanding of the further description of my testing equipment. It will be obvious from these remarks that the accurate adjustment of the breaker contacts may and, usually, does require repeated adjustments of the kind described in order to make the firing conditions practically uniform in all cylinders and it will, furthermore, be appreciated that, unless a close control is exerted, the work of the average mechanic can hardly be relied upon to give satisfactory results.

In the upper right-hand portion of Fig. 2 I have schematically indicated a conventional distributor mechanism comprising the high-tension coil T, the rotor 61, usually set on an extension 60 of the timer shaft, and coacting with the distributor contacts 63 as a travelling spark gap 62. From the contacts 63 the sparking potential is transmitted to the spark plugs P.

In the above description of my improved disk it has been assumed that any ordinary reference post be used in connection with the timing disk for determining the amount of its angular displacement with respect to a zero or reference position read off from the scale on the disk in conjunction with the mark or pointer of the reference post. I shall presently described my improved reference post which, besides fixing a zero mark for the position of the disk by means of a pointer, provides also a sparking electrode for making permanent spark records on the timing disk or on a graduated dial sheet to be put on the timing disk.

Referring to Fig. 4a a wall portion of the timer casing is shown at 90. The reference post is clamped to this wall portion, the left hand portion of the post forming a yoke 91 with legs 92, 93 to be seated on the timer casing in rider position. In the right hand cylindrical portion 94 of the post a plunger 96 with collar 97 and outer grasping knob 98 can be moved under the action of the coil spring 99. One end of this spring rests against the header 95 of the cylinder, while the other end abuts the collar 97 thus urging the plunger 96 into tightly clamping position on the wall. The stud 100 made of insulating material has a bulbous root portion 101 which is held in a neck portion 102 of the base element. After insertion from below of the stud a saucer-shaped plate 103 having a rough surface on its concave face for preventing unintentional turning movements of the stud in its support is introduced. Finally the coil spring 104 is put in place and the plug 105 screwed in. The plug 105 is provided with a diametrical conduit 106 (see Fig. 4b) to permit the free passage of the plunger therethrough.

From the central portion of the top face of the stud a cylindrical cavity 107 extends a certain depth into the body. This cavity is adapted to receive the metallic plunger 108 having a diametrically extending, axially oblong conduit 109 and a larger-diameter top extension 110 with socket cavity 111 therein. A rod 112 preferably consisting of a piece of hard wire and having an angularly bent end 113 tapering in a needle point serves as a pointer for cooperation with the marks on the scale of the timing disk. The upper stud portion is pierced by a bore hole coinciding with the hole in the plunger after its insertion in the cavity and depression against the action of the little spring 115. The rod is threaded through this common conduit and adjusted in its right position to the scale by axial and rotational displacements in its support, a further adjustment being possible by turning the stud in its support. It is obvious that this design may be modified in various particulars without departing from its general characteristics.

This construction of the reference post offers the advantages that the post can be securely attached to the timer casing by a simple clamping action, and that the adjustment of the needle point and the fixation of its position are most conveniently carried out. A still more important feature is that this post can also be used as a sparking electrode.

Two possibilities as to the general connecting scheme offer themselves as a method for obtaining spark records of the timing conditions. I shall presently describe these two modes none of which, as far as I am aware, has been practiced heretofore.

Fig. 3 shows one of my timing disks 3 and its adapter-bushing 10 applied to the timer shaft 70. A dial sheet 120 is set on the disk and held in position by the marginal portion 8 of the hub and the pin 7 on one of the spokes. My reference post, shown in detail in Figs. 4a and 4b, is indicated in Fig. 3 as attached to the timer casing 90, so that the pointer 113 is adjustable over the dial sheet. The reference post is shown connected from plug 110 to a source of sparking potential D, which may be the sparking potential of the system under test through connecting the plug 110 to the terminal 60 in the system shown in Fig. 2, though there are often reasons for using a source of sparking potential separate from that belonging to the system under test. Assuming first a test using the sparking potential of the system under test; that is, plug 110 in Fig. 3 connected to terminal 60 in Fig. 2, the contact points of the breaker mechanism function in their normal way as switches in the low-tension circuit of the ignition system.

The switch S will, therefore, be closed in this test so that the car battery V acts as the source of potential. When the engine is being turned over, there will be generated at each opening of the breaker points a high potential in the coil T. This high potential takes its way over terminal 60 to terminal 110, pointer 113, spark gap between needle point 113 and rim portion 3 of the timing disk, and then through the grounded timer shaft 70 and timer casing back to the coil. I have found that, if I use for the dial sheet a thin paper of fine and uniform structure, the sparks will pursue a straight vertical path from the needle point to the disk thus registering by puncture the commencement of a contact interruption in the breaker mechanism with great accuracy. Certain metal surfaces show distinct traces of electric sparks impinging upon them, such traces usually being effaceable. Instead of on a puncturable sheet the record may, therefore, also be made on a metal sheet or on the surface of the timing disk directly. Taking, for example, a six-cylinder engine the spark record of such an engine, after perfect adjustment of the timing device, will look as shown in Fig. 5. It will be noted that also in the dial sheets I prefer a scale not only giving the sectors corresponding to the number of cylinders, but, in addition, a finer graduation in degrees at both sides of the sector marks. Thereby, the mechanic, after some experience, is enabled to judge from the irregularities in the records taken before and between the adjustments the exact amount and possible causes of such deviations, which may be due to a faulty adjustment of the contact points, to wear in the riders or on the active cam portions, to parts of the breaker mechanism being out of alignment, etc.

The second way of obtaining spark records and the one which I prefer is by providing an independent sparking potential in lieu of the high-potential coil T of the ignition system. The circuit connections are principally the same as in Figs. 2 and 3. Preferably, I use for this purpose a small two-coil inductor of the vibrator type having a trembling blade in its low-tension coil which coil may be connected for its excitation either to a direct or alternating current supply. The breaker mechanism is connected in the circuit of the low-tension coil so that the breaker contacts act as switches in this circuit. One terminal of the high-tension coil is connected to the terminal 110, while the other terminal is grounded. This method of obtaining spark records has several advantages over the method described before. In the first place, it is desirable to be able to make such tests with switch S of the low-tension circuit in open position, since, frequently, the owner of the car has left the car in the shop with the ignition system locked and the ignition key either in his pocket or in some place of the car where it cannot be found. Secondly, in most cases the sparking potential from the coil of the car ignition system does not persist during the entire opening period of a pair of contact points; rather the magnetic field of this coil is exhausted before the breaker points touch again. But in a more accurate test it is desired to check up both the beginning and the duration of the opening periods. With the method under consideration sparking will occur during the periods that the breaker points maintain a closed circuit. During these periods the puncturing will be positive and uniform thus giving an absolutely reliable picture of the functioning of the breaker mechanism and one that is more easily interpretable, because of its greater uniformity and extension over a wider range on the dial sheet. A spark record of this kind taken from a perfectly timed mechanism will, therefore, have the appearance as depicted in Fig. 6.

In the three figures designated 7a, 7b and 7c I have illustrated a modification of my spark recorder. In order to obtain such spark records within the shortest possible time and to become more independent of the accessibility of the timer casing I use a kind of recording instrument as shown in a simple form in the different illustrations of Fig. 7.

A small spring or electric-motor 150 to be fed from any suitable A. C. or D. C. supply, is mounted on the base plate 153 and coupled to a reducing gear 151. The reducing gear drives the screw-threaded spindle 152 supported at its free end in a bearing 159. The spindle engages the block 155 which is slidably mounted in the rail 154 for travel along the axis of the revolving spindle. Situated on top of the block is an insulating stud 156 which holds in adjustable position one or more pointed electrodes such as 157, 158 which form a corresponding number of travelling spark gaps with the stationary record panel 160. This record panel is, preferably, provided with some clips as shown at 161, 162 for holding a detachable record sheet to be electrically punctured in fixed position on the panel. In Fig. 7 a cross-sectioned sheet of recording paper is shown placed on the panel exhibiting the spark record of a properly timed double-ignition system of a six-cylinder engine.

It is obvious that this recording instrument may be modified in many ways. For instance, instead of driving the block carrying the needle electrodes, the motor might be coupled to a drum carrying a reel of recording paper, whereas the needle electrodes would be mounted stationary.

In taking a record with this instrument it is, of course, indispensable that the engine be running at a sufficiently high speed to insure uniformity of angular velocity; in other words, the speed of the travelling spark gap must at all times be proportionel to the speed of the engine shaft. For this reason the instrument will preferably be used for taking records with the ignition system operating normally, that is with switch S in Fig. 2 closed. However, it is obvious that also in this case I could use an independent source of potential whose activity would be governed say by a relay connected in the breaker point circuit.

In order to receive a record as quickly as possible in the presence of the customer, it will only be necessary to connect the travelling gap to some point of the high-tension system, for example, by inserting a needle terminal into the socket terminal of the distributor cap.

In the foregoing paragraphs I have always referred to repair shop practice for exemplifying the various advantages of my invention. Another application of my spark recording equipment, as lastly described in a specific form, would be the installation of such an instrument on the instrument panel of the car or aircraft. This would enable the operator to check up the functioning of his ignition system at any time, a feature particularly desirable in the operation of aircraft engines.

Though I usually employ an electric spark for producing markings on the recording surface it would, of course, also be possible to make such markings by way of electrically influenced mechanical or other suitable means.

Summing up, it will be seen now that through my various improved apparatus I have developed a reliable system for the testing of timer devices providing the repair shop and the customer with perfect controls as to the work that had to be done and as to how it was done. When using my recording apparatus the mechanic is much more independent from the place where the car is put in the shop and from conditions of illumination as well. In addition, I may equip any internal-combustion-engine operated craft with a permanently built-in control of the firing order.

Minor changes within the scope of my invention will, of course, be permissible in the apparatus and, in this respect I wish to be limited rather by the appended claims than by the details of my disclosure.

What I claim is:

1. A timing disk assembly for use in the testing of timer devices of internal-combustion engines comprising a bushing member adapted to be connected to the timer shaft for simultaneous concentric rotation therewith, and a wheel-shaped timing member having a hub, rim, and spoke, said hub having a diametrically elastic portion of smaller inner diameter than the outer diameter of said bushing and being adapted to be slipped over said bushing in elastic engagement therewith.

2. A timing disk assembly for use in the testing of timer devices of internal-combustion engines comprising a cylindrical bushing member adapted to be attached over the end of the timer shaft in co-axial relation thereto, and a wheel-shaped timing member having a hub, a rim, and spokes, said hub being adapted to be fitted over said bushing and having a portion of larger internal diameter and another of smaller internal diameter, said smaller-diameter portion being formed by a plurality of diametrically elastic segments extending from said larger-diameter portion, the internal diameter of said smaller-diameter portion being somewhat smaller than the external diameter of said bushing for providing an elastic engagement between said hub and said bushing, said rim having a large enough inner diameter and said spokes having small enough lateral dimensions to leave spaces between the hub and the rim portions sufficiently wide for making adjustments therethrough of the breaker-points of the timer device, furthermore, said rim being provided with a scale of sector graduation.

3. A timing disk assembly for use in the testing of timer devices of internal-combustion engines comprising a cylindrical bushing member adapted to be attached over the end of the timer shaft in co-axial relation thereto, a wheel-shaped timing member having a hub, a rim and spokes, said hub being adapted to be fitted over said bushing and having a portion of larger internal diameter and another of smaller internal diameter, said smaller-diameter portion being formed by a plurality of diametrically elastic segments extending from said larger-diameter portion, the internal diameter of said smaller-diameter portion being somewhat smaller than the external diameter of said bushing for providing an elastic-engagement between said hub and said bushing, said rim having a large enough inner diameter and said spokes having small enough lateral dimensions to leave spaces between the hub and the rim portions sufficiently wide for making adjustments therethrough of the breaker-points of the timer device, furthermore, said rim being provided with a scale of sector graduation, and means including a pin situated on a plane-face portion of said wheel-shaped member for holding an apertured, removable dial sheet on said member in rotationally fixed relation thereto.

4. A timing disk assembly for use in the testing of timer devices of internal-combustion engines comprising a cylindrical bushing member adapted to be attached over the end of the timer shaft in co-axial relation thereto, and a wheel-shaped timing member having a hub, a rim, and spokes, said hub being adapted to be fitted over said bushing and having a portion of larger internal diameter and another of smaller internal diameter, said smaller-diameter portion being formed by a plurality of diametrically elastic segments extending from said larger-diameter portion, the internal diameter of said smaller-diameter portion being somewhat smaller than the external diameter of said bushing for providing an elastic-engagement between said hub and said bushing, said rim having a large enough inner diameter and said spokes having small enough lateral dimensions to leave spaces between the hub and the rim portions sufficiently wide for making adjustments therethrough of the breaker-points of the timer device, furthermore, said rim being provided with a scale of sector graduation on a surface thereof susceptible of effaceable electric spark traces.

5. A reference post for use as a reference pointer and sparking electrode in the testing of timer devices of internal-combustion engines and for attachment to the casing thereof, comprising a slotted base portion with yielding means joined thereto for placing said base portion on a wall portion of the timer casing in rider position and clamping engagement thereon, an insulating member on said base portion, a rod having a pointed end and being slidingly and adjustably held in said insulating member, means for fixing the position of said rod in relation to said insulating member, and means for electrically connecting a conductor to said rod.

6. A reference post for use as a reference pointer and sparking electrode in the testing of timer devices of internal-combustion engines and for attachment to the casing thereof, comprising a base portion including a portion with a slot therein, yielding means joined with said base portion and tending to narrow said slot for holding said slotted portion clamped to a wall portion of said timer casing in rider position thereon, an insulating stud held in said base portion with freedom to be rotated therein against frictional reaction, a cavity extending vertically in said insulating block from the top face thereof, a coil-spring on the bottom of said cavity, a plunger for insertion in said cavity against the action of said coil-spring and being provided with a top extension protruding from said top face, a conduit passing through said insulating stud near its top end and through the plunger in its depressed position, a rod having a pointed angularly bent portion and a straight portion passing through said bore hole, and means for joining an electric conductor to said protruding plunger portion.

HAROLD E. BARNES.